United States Patent [19]

Krackeler et al.

[11] Patent Number: 4,585,607
[45] Date of Patent: Apr. 29, 1986

[54] METHOD OF COVERING A MEMBER

[75] Inventors: Joseph J. Krackeler, Los Altos Hills; Fred E. Weir, Atherton, both of Calif.

[73] Assignee: Raychem Corporation, Menlo Park, Calif.

[21] Appl. No.: 382,819

[22] Filed: May 28, 1982

Related U.S. Application Data

[62] Division of Ser. No. 586,901, Jun. 16, 1975, Pat. No. 4,338,970.

[51] Int. Cl.[4] .............................................. B32B 31/16
[52] U.S. Cl. ..................................... 264/229; 29/450; 156/85; 156/86; 156/344; 174/DIG. 8; 264/230; 264/342 R; 428/36; 428/913
[58] Field of Search .................. 156/85, 86, 149, 344, 156/84; 174/DIG. 8, 135, 138 F; 29/235, 450, 868; 138/103, 141; 428/36, 43, 913; 264/229, 230, 342 R

[56] References Cited

U.S. PATENT DOCUMENTS

| | | | |
|---|---|---|---|
| 1,520,940 | 12/1924 | Dulitz | 264/342 R |
| 2,406,592 | 8/1946 | Davies | 156/155 |
| 2,565,316 | 8/1951 | Lucas et al. | 156/84 |
| 2,803,056 | 8/1957 | Brissey et al. | 29/235 |
| 2,993,820 | 7/1961 | Marshall | 156/86 |
| 3,319,328 | 5/1967 | Finger et al. | 52/301 |
| 3,396,460 | 8/1968 | Wetmore | 29/629 |
| 3,474,517 | 10/1969 | Menne | 156/344 |
| 3,515,798 | 6/1970 | Sievert | 174/84 |
| 3,669,824 | 6/1972 | Hess | 156/53 |
| 3,684,602 | 8/1972 | Ball | 156/149 |
| 3,770,556 | 11/1973 | Evans et al. | 174/DIG. 8 |
| 3,824,331 | 7/1974 | Mixon et al. | 29/450 |
| 3,883,384 | 5/1975 | Hopkins | 156/149 |
| 3,898,369 | 8/1975 | Clabburn | 428/36 |
| 4,035,534 | 7/1977 | Nyberg | 428/36 |
| 4,207,364 | 6/1980 | Nyberg | 156/86 |

Primary Examiner—Caleb Weston
Attorney, Agent, or Firm—Edith A. Rice; James G. Passé; Herbert G. Burkard

[57] ABSTRACT

A recoverable tubular article comprising an elastomeric sleeve held in an expanded or extended condition and capable of recovering to its unexpanded condition of smaller diameter upon the removal of an outer restraint, an outer restraint, essentially tubular in configuration, bonded to said elastomeric sleeve, said restraint and said bond between the sleeve and the restraint being sufficiently strong to retain the elastomeric sleeve in its expanded condition under ordinary conditions of storage and said restraint being capable of being segmented and peeled from said elastomeric sleeve to permit said sleeve to recover to its original state.

7 Claims, 5 Drawing Figures

METHOD OF COVERING A MEMBER

This is a divisional of application Ser. No. 586,901 filed June 16, 1975, now U.S. Pat. No. 4,338,970.

BACKGROUND OF THE INVENTION

Heat recoverable sleeves have found wide utility in many applications. Thus, heat recoverable sleeves are used as insulators for electrical conductors, particularly at areas where splices are formed in the electrical conductors. The sleeves have been particularly successful because they allow rapid and uniform application of an insulating covering. Typically, an electrical conductor which is to be spliced or repaired first has an expanded heat recoverable sleeve placed over the conductor. The repair is then made and the sleeve is put in place over the splice and recovered by the application of heat. Such methods have proven quicker, more convenient, and more reliable than prior methods such as taping and vulcanizing.

A disadvantage in use of heat recoverable sleeves is that a heat source is necessary for the recovery. Suitable heat sources include torches and hot air guns. In some cases, it is undesirable to use torches because of the danger of fire being started by the open flame. In other situations, working conditions are so cramped or otherwise difficult that it is not convenient to place a heat source such as a torch or heat gun close to the sleeve which is to be recovered. The use of heat-recoverable sleeves may also be undesirable where the substrate on which the sleeve is to be shrunk is temperature sensitive.

Various methods of recovering sleeves without the application of heat have been proposed. In particular, various types of expanded sleeves with internal restraints holding the sleeves in the expanded condition have been disclosed. One such sleeve comprises an expanded sleeve held in the expanded state by a cylinder of ice as disclosed in U.S. Pat. No. 3,319,328. In actuality, such a sleeve is also a heat-recoverable sleeve because it requires a minimal amount of heat to melt the ice and allow the sleeve to recover. However, the heat necessary is so low that such a sleeve is not normally considered a sleeve requiring an application of an outside heat source. Another type of sleeve having an internal restraint is that described in U.S. Pat. No. 3,515,798 wherein a rigid removable mechanical insert holds the sleeve in the expanded condition until the insert is removed.

In general, all of the proposals for making recoverable sleeves which do not require heat have involved internal restraints, configurations which place a restraint between the substrate and the internal surface of the sleeve or involve contacting the internal surface of the sleeve with some foreign material. Such configurations present various problems.

Frequently, it is desired to coat the inner surface of a recoverable sleeve with a sealant or adhesive material. Configurations of heat recoverable sleeves with internal restraints often make the use of such an internal coating difficult or impossible. Furthermore, the imposition of an internal restraint between the sleeve and substrate makes fitting of the sleeve over the substrate difficult and reduces the range of substrate sizes which the sleeve can be fitted over.

SUMMARY OF THE PRESENT INVENTION

The present invention provides a recoverable sleeve which does not require the application of heat for recovery and which is held in the recoverable position by an external restraint. The extended sleeve is held in the position by a restraint bonded to the sleeve. Recovery of the sleeve is achieved by weakening the sleeve sufficiently to allow recovery.

DESCRIPTION OF PREFERRED EMBODIMENTS

The Recoverable Sleeve

Figure 1:
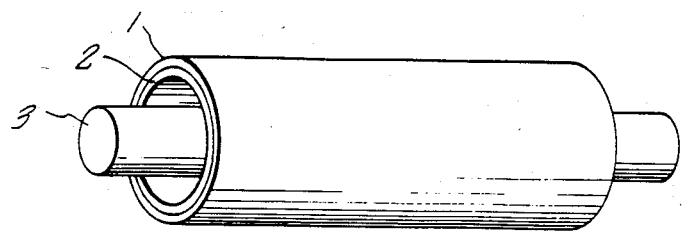
FIG. 1 is a perspective view of the article of the invention in position for being shrunk down about a substrate.

An article according to the present invention is shown in FIG. 1. It can be seen that the article comprises an outer rigid restraint 1 and an inner recoverable tube 2. The recoverable tube or sleeve is preferably an elastomeric sleeve. However, recoverable sleeves of other materials such as metallic split cylinders in tension may be used. The elastomeric sleeve must be capable of being stretched or extended radially to a dimension from which the sleeve can recover upon the removal of the restraint holding it in the stretched or extended condition.

For the elastomeric sleeve, virtually any desired material possessing elastomeric recovery properties may be used. The elastomeric material should be one which does not exhibit a substantial permanent set or decrease in recovery on storage. Suitable elastomers include materials such as natural and synthetic polyisoprenes, cis-polybutadiene, styrene-butadiene rubber (SBR), butadiene-acrylonitrile rubber, polychloroprene (neoprene), butyl rubber, polysulfide, silicone rubber, urethane rubber, polyacrylate, epichlorohydrin homo and copolymers, propylene oxide rubber, fluorosilicone rubber, fluorocarbon rubber, chlorosulfonated polyethylene, chlorinated polyethylene, ethylene-propylene rubber, nitroso rubber and phosphonitrilic rubber. The properties of the sleeve are, to a large extent, dependent upon the intended use of the sleeve. Thus, if the sleeve is to be used primarily as an electrical insulation, its electrical properties will be of primary importance. On the other hand, if the sleeve will be subjected to much physical abuse, it may be necessary to provide a sleeve which has strength, good flame resistance, good solvent resistance, etc. For high voltage uses, it may be desirable to have a sleeve which has been made semi-conductive by dispersing large amounts of suitable fillers or conductive particles in the sleeve or possesses resistance to tracking and/or erosion.

To some extent, the nature of the sleeve is dependent upon the nature of the restraint as is readily apparent to those skilled in the part. Thus, the force of recovery exerted by the expanded elastomeric sleeve cannot exceed either the strength of the restraint or of the bond between the sleeve and the restraint. Further, it is necessary to choose a sleeve which is compatible with the restraint to the extent that it can be bonded to the restraint. These and other aspects of the relationship between the sleeve, the adhesive and the restraint will become clear in the discussion of the invention set forth below.

The Restraint

According to the present invention, the recoverable sleeve 2 is held in its extended or stretched condition by external tubular restraint 1. This restraint is depicted in FIG. 1 as being a tube having a circular cross section. However, any tubular article, i.e., an article at least a portion of which is closed in cross section, may be employed.

The restraint may be made of any suitable material such as rigid polymeric material, metal, ceramic, wood or wood products such as paper, resin reinforced or impregnated paper, etc. In general, it is necessary only to use a material having sufficient strength to hold the recoverable material in its extended condition without being deformed or collapsed and that it be capable of being segmented and peeled from the recoverable sleeve.

Prior to segmenting the only point at which peeling can be initiated is the circular edge of the restraint. Further, when the restraint is in its unsegmented monolithic form it is not possible to apply force to the restraint to peel it away from the recoverable sleeve. Segmenting thus makes it possible to remove the restraint by applying a peeling force to it and provides a greatly increased edge area at which peeling of the restraint from the sleeve can be initiated.

It is further desirable that the restraint be capable of being readily bonded to the recoverable sleeve so that it will hold the recoverable sleeve in its extended condition. The bond may be formed by adhesion directly between the sleeve and the restraint or by bonding the sleeve and restraint with an adhesive.

Particularly suitable outer restraints of polymeric material include any rigid thermoplastic including polyvinyl chloride, polyethylene and cross-linked polyethylene, polystyrene, copolymers of styrene such as copolymer of styrene and acrylonitrile, ABS polymer, etc.

Metallic outer restraints such as steel, tin, aluminum, etc., are also especially suitable for this invention.

The restraint may be segmented by various means such as shattering the restraint by impact, tearing the restraint, e.g., along serrations or scores, cutting, etc.

Figure 2:
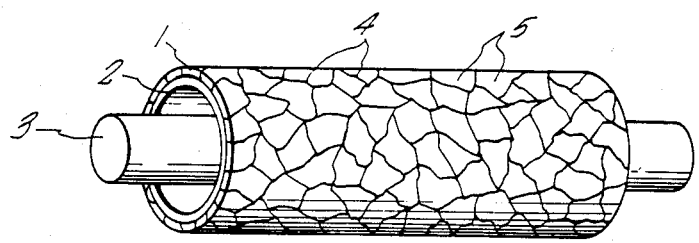
FIG. 2 is a perspective view of the article of the invention wherein the restraint has been segmented by fracturing.
Figure 3:
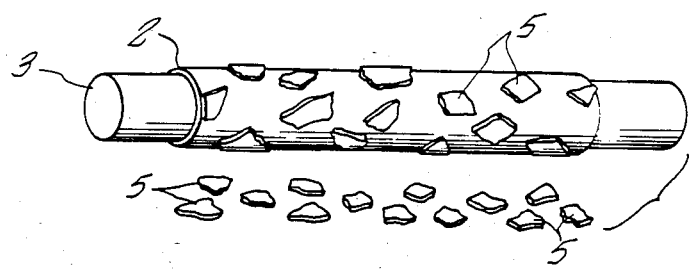
FIG. 3 is a perspective view of the recoverable sleeve after it has been recovered onto a substrate.

A particularly convenient means of forming a removable restraint is to form the restraint from a frangible material such as polyvinyl chloride which will fracture when given a sharp blow. Thus, the polyvinyl chloride restraint can simply be given a blow with a hammer causing it to shatter and become segmented making it possible to apply force to peel away the segments allowing the recoverable sleeve to recover onto a substrate. FIGS. 2 and 3 illustrate this procedure. As shown in FIG. 2, the restraint 1 is shattered along fracture lines 4 to form small segments 5. Upon application of a peeling force such as scraping the restraint segments are peeled away allowing the sleeve to shrink as shown in FIG. 3. The segments may be removed by weakening the bond between the sleeve and the restraint, e.g., attacking the bond with a solvent to eliminate the necessity of applying a peeling force.

Figure 4:
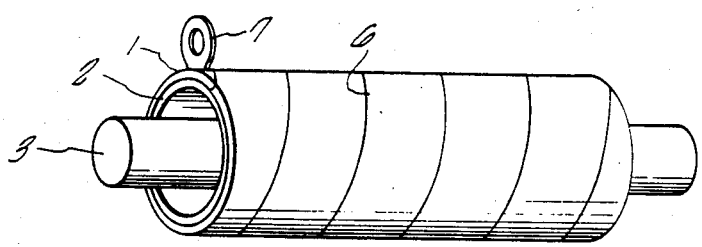
FIG. 4 is a perspective view of a recoverable sleeve wherein the restraint can be segmented and peeled along scored lines.
Figure 5:
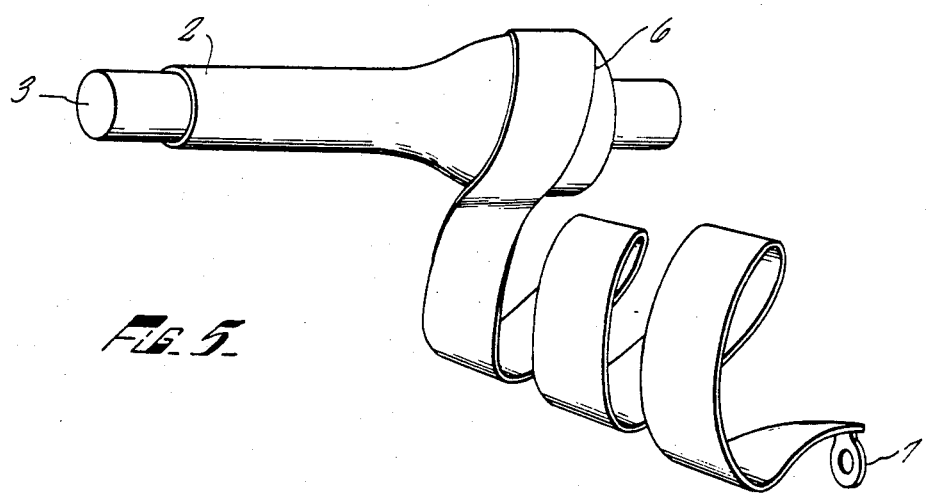
FIG. 5 is a perspective view of the sleeve after it has recovered onto a substrate.

FIG. 4 is illustrative of a segmentable metallic outer restraint. There, outer metallic restraint 1 is scored or serrated or in some other way weakened along the lines 6. The restraint can be simultaneously segmented and removed by peeling it off along the weakened lines 6. For convenience, a pullring 7 of the type supplied on beverage cans may be provided.

To facilitate peeling of the segments, the outer surface of the restraint may contain means for applying a peeling force such as the pullring 7 or other grippable projections.

The Bond

The bond between the elastomeric sleeve and the outer restraint should be sufficiently strong so that the bond will prevent separation of the expanded elastomeric sleeve from the restraint under normal conditions of storage and handling over a long period of time.

The bond may be formed simply by adhesion of the sleeve to the restraint without the use of any additional bonding agent. Such adhesion may occur when two polymeric materials are joined together, particularly at an elevated temperature such that they are both tacky. For example, in using a polyvinyl chloride restraint for a neoprene elastomeric sleeve, it has been found convenient to injection mold the polyvinyl chloride around the neoprene sleeve. At the injection molding temperatures, a bond is formed between the polyvinyl chloride restraint and the neoprene sleeve.

It is frequently desirable to use adhesives to insure a suitable bond between the sleeve and the restraint. Any adhesive which will provide a strong enough bond to prevent premature recovery of the sleeve may be used.

In general, hot melt adhesives are preferred. A hot melt adhesive would normally be applied by coating one or both surfaces with a solution of the adhesive, allowing the solvent to evaporate and then bringing the surfaces together under the application of heat and pressure.

A preferred hot melt adhesive for neoprene-PVC is a multisegmented block copolymer comprising units of polytetraethylene ether and polytetramethylene terephthalate. A polymer of this type is sold by DuPont under the trade name HYTREL. This adhesive forms a strong bond between neoprene and polyvinyl chloride. It has the additional disadvantage of being readily weakened by application of a number of solvents.

Various copolymers may be used as adhesives such as copolymers of ethylene vinyl acetate, e.g. ELVAX from DuPont copolymers of ethylene-ethylacrylate, etc. Terpolymers such as terpolymers of ethylene, vinyl acetate, and methacrylic acid may also be used. These adhesives may be used alone or with tackifiers.

Other hot melt adhesives suitable in the practice of this invention are polyamide resin adhesives. Exemplary of such adhesives are those available from General Mills under the trade name VERSALON, polyester adhesive, (see, e.g., DuPont Technical Bulletin No. 17—"Polyester Adhesives") and the wide variety of polyvinyl, polybutene, and polyacrylate adhesives with which the art is familiar.

Various rubber based adhesives such as those based upon silicone, nitrile, and neoprene may be used.

Preferably, the adhesive will have greater strength in tension than it has in peel. The strength will prevent recovery during storage. When a peel force is applied during recovery the low peel strength makes recovery possible without the necessity of applying a large force.

In general, any adhesive is suitable if it has good affinity for the surface of the restraint and the sleeve and is resistant to creep under load. Preferably the adhesive is thermoplastic so that it will soften on heating to flow and ultimately wet the surface of both the restraint and sleeve.

Any suitable method of applying the adhesive to the surfaces of the sleeve and/or the restraint may be employed. A satisfactory method of application is to apply the adhesive from solution to one or both surfaces and allow the solvent in the adhesive to evaporate, bringing the surfaces together under the application of pressure and, if desired, heat to form a strong bond.

In one embodiment of this invention, the outer restraint is injection molded around the sleeve. In that case, the adhesive is applied to the surface of the elastomeric sleeve prior to the time of injection molding. In general, it is desired that the peel strength of the adhesive bond be greater than 10 pounds per inch and preferably that the peel strength be greater than 20 pounds per inch. However, there is no absolute requirement with regard to peel strength. Thus, the important consideration is whether the peel strength is sufficient to prevent the sleeve from peeling away from the restraint during storage or at any time prior to the time when it is desired to shrink the sleeve down about the substrate. Of course it is within the scope of this invention to provide an inner restraining core, e.g., a cardboard tube, to prevent premature recovery. If the force tending to cause the sleeve to shrink and peel away from the restraint is not great, a high peel strength is not so necessary. On the other hand, if a sleeve having an extremely high retractive force is employed, it is necessary to use an adhesive which will form a bond having a high peel strength.

Internal Coating

The recoverable sleeve may be coated on its internal surface with various materials for contacting the substrate. Thus, an adhesive may advantageously be applied to the interior surface of the recoverable sleeve so that the sleeve will form a bond with a substrate about which is recovered. Because the recoverable sleeve of this invention does not require heat for its recovery, it is preferred to employ an adhesive which does not require the application of heat to form a strong bond with a substrate. In this regard, various contact or pressure sensitive adhesives may be employed.

In addition to adhesives, various other materials may be employed on the internal surface of the recoverable sleeve. For example, materials of the type described in U.S. Pat. No. 3,396,460 may be used. In many instances, it is desired to coat the inside of the sleeve with materials which will flow under the application of pressure at the temperature of application. Preferably, these materials will adhere to both the sleeve and the substrate. Particularly suitable materials for this application are mastic and mastic-like materials.

The recoverable article of the present invention has a wide range of applications. Thus, it can be used for any application in which heat recoverable sleeves are normally used. For example, it can be used for insulating splices in electrical conductors in both low and high voltage applications. The article may be used for covering repairs or joints in electronic equipment. The sleeves are particularly suitable for use in covering splices and repairs in telephone cables and cable TV lines.

An area where heat recoverable sleeves have had a great deal of use in recent years is for the repairing of splices in electrical cables used in mines. The sleeves of the present invention are particularly suitable for such mine cable splices because they do not require the application of heat which is usually accomplished by the use of a torch. This may be a major advantage, particularly in gassy mines where torches present great safety dangers.

Fabrication Procedures

A number of methods are available for manufacturing the articles of this invention. Simply stated, the articles can be formed by bonding the sleeve, in the expanded or extended state, to an outer restraint. One convenient method of accomplishing this is to form an outer restraint of the desired size and an elastomeric sleeve of the desired final diameter. Then, the inner surface of the restraint and the outer surface of the elastomeric sleeve are coated with a suitable adhesive and the elastomeric sleeve is expanded into contact with the restraint by internal air pressure, a mandrel, etc. The sleeve is held in contact with the restraint for a period of time sufficient for a bond to be formed whereupon the mandrel or internal pressure is removed.

Another technique for forming the article comprises first forming the sleeve and then injection molding the outer restraint around the sleeve. In this method, the sleeve is first coated with adhesive. Then, the outer restraint material is injection molded around the sleeve. Before the restraint has hardened on cooling, the restraint and sleeve are expanded by a mandrel or compressed air to give the desired expansion and desired final inside diameter to the sleeve. While the sleeve is in the expanded condition, the restraint is cooled and hardened and upon removal of the mandrel or release of the air pressure, the sleeve remains bonded to the restraint and held in the expanded condition.

The injection molding process described above has been found to be particularly suitable for use with a combination of a neoprene sleeve, a HYTREL adhesive, and a polyvinyl chloride restraint. However, it will be readily obvious that the process can be carried out using a wide range of suitable materials.

As indicated herein, a wide variety of materials may be used to manufacture the article of the present invention depending upon the desired properties of the article. In the case of mine splices, it is necessary to provide a recoverable sleeve which has great strength and abrasion resistance in the recovered state. These requirements are dictated by the mechanical abuse which mine cables must survive. Thus, properties such as tensile strength, elongation, flammability, abrasion resistance, and dielectric strength are all important considerations for such sleeves. Additionally, it is important that the sleeves resist peeling or creeping away from the splice which they cover. Typically, mine sleeves are wound on and off cable reels in the mines, are pulled over sharp rock surfaces, and are frequently exposed to impact against sharp edges.

It has been found that a combination of materials used in accordance with this invention will provide a recoverable article having properties sufficient for use in the extremely demanding environment of the mine. In particular, a recoverable elastomeric mine sleeve requires an extremely high recovery force and thus it has been necessary to provide a restraint and adhesive which will provide a strong bond between the restraint and sleeve to maintain the sleeve in the desired extended condition until recovery is desired.

According to the present invention, an elastomeric sleeve having a good combination of properties and being suitable for use as a mine splice sleeve comprises a neoprene sleeve having either of the following compositions:

TABLE I

| Component | Parts By Weight A | B |
|---|---|---|
| Neoprene rubber | 100 | 100 |
| Phenyl-alpha-naphthlamine | 2 | 2 |
| Magnesium Oxide | 1 | 1 |
| Stearic acid | 0.5 | 0.5 |
| HAF Carbon Black | 5 | 5 |
| Hydrated alumina | 10 | 10 |
| Precipitated Silica | 15 | 15 |
| Antimony oxide | 15 | 15 |
| Tri (Z—ethylhexyl) phosphate | 4 | 4 |
| Zinc oxide | 5 | 5 |
| N—Cyclohexyl-2-benzothiazole sulfeamide | 1 | 0.75 |
| A treated amine sold by DuPont as TA-11 | 2 | — |
| Tetramethyl thiourea | — | 0.75 |

When cured at 350° F. for 15 minutes, a slab 0.075 in. thick and a tube having an inside diameter of 0.75 in. and an outside diameter of 1.0 in. from these compositions were found to have the following properties:

TABLE II

| | A | B |
|---|---|---|
| SLAB PROPERTIES | | |
| Tensile Strength, psi | 4400 | 3000 |
| Ultimate Elongation, % | 710 | 650 |
| Tensile Stress at: | | |
| 100% Elong. | 290 | 260 |
| 200% Elong. | 650 | 385 |
| 300% Elong. | 1150 | 610 |
| TUBE PROPERTIES | | |
| Tensile Strength, psi | 1990 | 970 |
| Ultimate Elongation, % | 510 | 430 |
| Tensile Stress at: | | |
| 100% Elong., psi | 250 | 230 |
| 200% Elong., psi | 460 | 330 |
| 300% Elong., psi | 850 | 500 |
| Tensile Strength at 150° C., psi | 370 | 280 |
| Ultimate Elongation at 150° C., % | 200 | 150 |
| Tear Strength (Die C), pli | 370 | 215 |
| Tear Strength (Die C) at: 150° C., pli | 90 | 80 |
| Tape Abrasion (¼" strip, 250" tape, 2 lb. wt., 1504 Grid, mil) | 35 | 36 |
| Tensile Set (200% elong. at RT) | | |
| After 24 hrs., % | 1 | 2 |
| After 7 days, % | 6 | 10 |

Using the compositions of Table I, tubes of neoprene having an i.d. of 0.75 in. and an o.d. of 1.0 in. were molded. The neoprene tubes were placed in an injection mold and a polyvinyl chloride composition as set forth below in Table III was injected around it. Two suitable polyvinyl chloride compositions are as follows:

TABLE III

| Component | A | B |
|---|---|---|
| Polyvinylchloride | 100 | 100 |
| An organotin stabilizer sold by M & T Chemicals | 3 | 3 |
| A cycloaliphatic epoxy sold by Ciba-Geigy | 4 | 4 |
| Low molecular weight polyethylene | 2 | 2 |

TABLE III-continued

| Component | A | B |
|---|---|---|
| Low nolecular weight nitrile rubber | 10 | — |

Prior to the injection of the polyvinyl chloride, the outer surface of the neoprene sleeve was abraded and coated with a 5% solution of HYTREL in chloroform and dried. Prior to injection molding, the tubes were preheated to soften the adhesive. Injection Molding Machine using the conditions set forth in Table IV, below:

TABLE IV

| Machine Temperature | |
|---|---|
| Nozzle heat, °F. | 390 |
| Front heat, °F. | 375 |
| Center heat, °F. | 365 |
| Rear heat, °F. | 300 |
| Mold Temperature | |
| Manifold, °F. | 275 |
| Front plate, °F. | 175 |
| Back plate, °F. | 200 |
| Machine Settings | |
| Injection time, seconds | 15 |
| Cooling time, seconds | 15 |
| Total cycle time, seconds | 60-90 |

The resulting tubular article was expanded by preheating the tube and expanding 100 to 200% using air pressure to expand the tube into a cold expansion mold. The peel strength was found to be about 40 lb/in. between the polyvinyl chloride restraint and the neoprene sleeve.

The tube was recovered by fracturing the restraint with a hammer and allowing the sleeve to recover onto a substrate.

The tubular articles of this invention may be expanded using the apparatus and method described in Greuel application Ser. No. 436,675 entitled EXPANSION APPARATUS AND PROCESS and filed Jan. 25, 1974 (now abandoned).

It is to be understood that the foregoing examples are merely illustrative of the invention and that the scope is not limited to these exemplary embodiments of the invention. For example, metallic restraints may be used with suitable adhesive to bond the metal and elastomer. Thus, the scope of the invention is limited only by the scope of the appended claims.

We claim:

1. The method of covering a member comprising:
   positioning over said member a recoverable tubular article comprising:
   (a) a tubular sleeve held under tension in a radially expanded condition such that upon the release of the tension the sleeve tends to assume a smaller diameter and
   (b) a restraint having an essentially tubular configuration bonded to said sleeve;
   segmenting said restraint and
   peeling said restraint from said sleeve to allow recovery of said sleeve onto said member.

2. The method of claim 1 wherein the restraint comprises a frangible material.

3. The method of claim 1 wherein the restraint is a metallic restraint having weakened portions so that it can be segmented at the weakened portions.

4. The method of claim 1 wherein said restraint is a plastic or metallic tube having helical scores on its outer surface.

5. A method of covering a member which method comprises:
   (a) positioning over said member a recoverable tubular sleeve which is held in a radially expanded condition by applying to said sleeve restraint forces applied by a tubular restraint which surrounds the recoverable tubular sleeve and is substantially concentric therewith; and
   (b) releasing the restraint forces by segmenting the tubular restraint.

6. A method of covering a member which method comprises:
   (a) positioning over said member a recoverable tubular sleeve which is held in a radially expanded condition by applying to said sleeve restraint forces applied by a tubular restraint which surrounds the recoverable tubular sleeve and is substantially concentric therewith; and
   (b) releasing the restraint forces by segmenting the tubular restraint and then removing one or more of the segments of the tubular restraint.

7. A method of covering a member, which method comprises:
   (a) surrounding the member with a recoverable tubular sleeve which is held in a radially expanded form by an external restraining means; and
   (b) causing the recoverable tubular sleeve to decrease in direction by segmenting the restraining means such that the tubular sleeve only comes into contact with the member to be covered.

* * * * *